UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

LIGHTNING-ARRESTER.

989,487. Specification of Letters Patent. Patented Apr. 11, 1911.

Application filed August 26, 1909. Serial No. 514,672.

*To all whom it may concern:*

Be it known that I, ELMER E. F. CREIGHTON, a citizen of the United States, residing at Schenectady, in the county of Schenectady, State of New York, have invented certain new and useful Improvements in Lightning-Arresters, of which the following is a specification.

My invention relates to lightning arresters and more particularly to lightning arresters of the type in which a number of electrolytic cells or condensers are connected between the conductors of the system to be protected and ground.

Electrolytic cells or condensers when used as lightning arresters for a transmission line are generally connected to the conductors of the transmission line through spark gaps set to break down at voltages slightly above the normal potential of the system whereby the abnormal potential discharges through the spark gap and the aluminum arrester to ground. Under these conditions the electrolytic cells are normally entirely disconnected from the line and the film on the electrodes of the cells gradually deteriorates, so that it is necessary to pass current through the cells at intervals in order to maintain the cell in good condition, and as the cells are proportioned to break down at a voltage somewhat higher than the normal voltage of the transmission system the full potential of the system must be applied in order to send enough current through the cell to build up the film. It is also customary on a polyphase transmission system to provide as many electrolytic cells as there are conductors, each cell being connected at one terminal to the conductor and the other terminals being electrically connected at a common or neutral point, which in turn is connected to ground through an additional or ground cell. With this arrangement it is easy to apply the normal potential of the system to the cells which are directly connected to the conductors, but it is difficult to send enough current through the ground cell to keep its film in good condition, and the object of my invention is to arrange the connections of the electrolytic cells in such a manner that the ground cell may be subjected to the normal potential of the line and thereby all of the cells be kept in good condition; to provide an improved form of transfer switch for controlling the connections of the cells to ground and to the conductors, and in general to improve the construction of lightning arresters of the electrolytic type.

In carrying out my invention I provide a selective controlling or switching mechanism for the condensers by means of which the operator can arbitrarily select a cell and connect it as a ground cell while the remaining cells are connected to the conductors. If the film on the ground cell deteriorates, another cell can be connected in as the ground cell while the one which was first used as the ground cell is connected to the line and by transposing the cells and charging them in the usual way, the films in all the cells can be kept in good condition. In the preferred construction, two cells are mounted side by side and are alternately used as ground cells, while the remaining cells which constitute the arrester are directly connected to the conductors. By means of a suitable control or switching mechanism either one of the two above mentioned electrolytic cells may be connected to ground, while the other one is connected to one of the conductors of the transmission system. Whenever the operator desires to do so the switch mechanism may be manipulated to interchange the connections so that the cell which was the ground cell is directly connected to the conductor and the other cell becomes the ground cell. Various forms of switching mechanism may be used for accomplishing this purpose, but in the preferred construction the switch is a rotatable switch mounted between the two electrolytic cells and provided with switch blades which coöperate with the terminals of both cells, one of the switch blades being grounded and the other connected to the conductor of the transmission system, so that the relation of the two cells to ground and to the conductor may be transposed by altering the position of the switch.

My invention will best be understood in connection with the accompanying drawings which show, merely for purposes of illustration, one of the many forms in which my invention may be embodied and in which—

Figure 1 is a diagrammatic view showing my invention embodied in an electrolytic arns# UNITED STATES PATENT OFFICE.

WILLIAM H. DANNER, OF LAGRANGE, INDIANA.

SLIDING DOOR.

989,488.   Specification of Letters Patent.   Patented Apr. 11, 1911.

Application filed June 4, 1909. Serial No. 500,138.

*To all whom it may concern:*

Be it known that I, WILLIAM H. DANNER, a citizen of the United States, residing at Lagrange, in the county of Lagrange and State of Indiana, have invented a new and useful Sliding Door, of which the following is a specification.

The invention relates to improvements in sliding doors.

The object of the present invention is to improve the construction of sliding doors, and to provide a simple, inexpensive and efficient sliding door, capable of being substituted for an ordinary single or double sliding door, and composed of independently slidable upper and lower sections, adapted to be moved either to the right or left to expose the inner door opening or only the upper or lower section thereof.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a front elevation of a sliding door constructed in accordance with this invention. Fig. 2 is a vertical sectional view of the same. Fig. 3 is a horizontal sectional view.

Like numerals of reference designate corresponding parts in all the figures of the drawing.

The slidable door is composed of upper and lower sections 1 and 2, slidably suspended from the horizontal tracks 3 and 4, arranged above the door opening 5 and suitably secured to the structure having the door opening, as clearly illustrated in Fig. 1 of the drawing. The horizontal tracks, which may be constructed in any suitable manner, have angularly bent terminals 6 and 7, which off-set the track bars from the wall 8 to which they are secured. The said track bars are arranged in parallelism, and the upper and lower sections 1 and 2 of the door are of greater width than and extend beyond the door opening at opposite sides thereof. The upper section 1, which may be constructed of any suitable material, is hung from the lower track bar 3 and is provided at opposite sides of its upper portion with suitable hangers 9 having grooved wheels 10, located between the track bars and arranged upon the upper edge of the lower one. The lower section 2 is suspended from the upper track bar 4 by means of vertical hanger bars 11, provided with lower attaching portions 12, which are secured to the outer face of the lower section 2 adjacent to the side edges thereof. The hanger bars 11 are bent outward above the attaching portions 12 to clear the upper section 1 of the door, and they are provided at their upper ends with grooved wheels 13, arranged to run upon the upper edge of the upper track bar 4. The grooves of the wheels 10 and 13 form pronounced vertical side flanges, which are arranged to engage the side faces of the track bars to prevent displacement of the hangers. The upper portions of the hanger bars 11 are connected by a horizontal bar 14, located above the wheels 10 of the upper section 1 of the door and secured to the hanger bars at the upper angular bends 11$^a$ thereof. The hanger bars 11 are located beyond the door opening, when the lower section of the door is closed so as not to occupy a position in front of the upper portion of the door opening, when the upper section 1 of the door is open, the upper portion of the door opening being entirely exposed when the upper section 1 is moved either to the right or to the left to a point beyond the door opening.

The sections of the door are slidable independently of each other and either may be moved to the right or to the left, upper and lower stops 15 and 16 being provided for limiting the movement of the sections of the door. The stops 15 and 16, which may be of any preferred construction, preferably consist of L-shaped plates, secured to the wall in spaced relation with the door opening and having outwardly projecting wings or flanges arranged in the path of the slidable sections 1 and 2. The lower section of the door, when closed, is engaged by horizontally disposed rollers or wheels 17, supported by suitable brackets 18, secured to the wall below the door opening. The rollers prevent the lower section 2 of the door from swinging outward. The brackets 18, which may be of any preferred construction, consist of intermediate L-shaped portions and upper and lower horizontal and vertical terminal portions 19 and 20. The upper horizontal terminal portion receives the